United States Patent [19]

Mast et al.

[11] Patent Number: 4,519,682

[45] Date of Patent: May 28, 1985

[54] OPTICAL IMAGE AMPLIFIER

[75] Inventors: Fred Mast, Wil; Rudolf Waser, Regensdorf, both of Switzerland

[73] Assignee: GRETAG Aktiengesellschaft, Regensdorf, Switzerland

[21] Appl. No.: 204,174

[22] Filed: Nov. 5, 1980

[30] Foreign Application Priority Data

Nov. 8, 1979 [CH] Switzerland ............. 10003/79

[51] Int. Cl.³ .............................................. G03B 21/00
[52] U.S. Cl. .................................................. 353/122
[58] Field of Search ................. 250/213 R; 353/121, 353/122, 31; 350/340, 342, 359, 360, 361

[56] References Cited

U.S. PATENT DOCUMENTS

| | | | |
|---|---|---|---|
| 2,875,350 | 2/1959 | Orthuber et al. | 250/213 R |
| 2,975,294 | 3/1961 | Kazan et al. | 250/213 R |
| 3,527,522 | 9/1970 | Baumgartner | 350/361 |
| 3,638,027 | 1/1972 | Koelmans | 250/213 R |

Primary Examiner—Harry N. Haroian
Attorney, Agent, or Firm—Burns, Doane, Swecker & Mathis

[57] ABSTRACT

Light from a light source reaches a control element via a lens system and a first bar system, is reflected and diffracted there according to local deformations and passed on to a projection surface via a concave reflector, a second bar system and a further lens system. The picture to be amplified is imaged by means of a lens system on a photoelectric conducting layer in the control element. A control layer of the control element is a gel layer and is located between two electrodes in an electrical alternating field that is influenced by the photoelectric conducting layer. The electrode adjacent to the photoelectric conducting layer is formed as a strip grid wherein all strips have the same potential relative to the other electrode. The image to be amplified is exposed on the photoelectric conducting layer in grid-masked form, whereby the grid is disposed orthogonally to the electrode grid. The electrode grid is disposed orthogonal to the bars. The optical masking of the image is effectively achieved by a reflecting grid, by an absorption grid on the surface of a fiberboard or by the photoelectric conducting layer itself consisting of individual strips. The system shows a very small base deformation of the control layer and has relatively high sensitivity and high efficiency.

18 Claims, 5 Drawing Figures

OPTICAL IMAGE AMPLIFIER

BACKGROUND OF THE INVENTION

The present invention relates to a device for amplifying the intensity of an electro-optically created image.

One of the earliest devices of this type, generally referred to as optical image intensifiers, is described for example in Swiss Pat. No. 301,222. The main operating principle of this device consists of imaging a system of bars, arranged parallel to and spaced apart from one another, on a related second bar system, by means of a reflecting zone. The reflecting zone is located on a control layer which can be deformed by electrostatic field forces and is arranged, together with a photoelectric conducting layer, in an electrostatic field. The picture to be amplified is imaged as a grid-like pattern on the photo-electric conducting layer, thereby locally changing the electrostatic field in accordance with the image and effecting a corresponding deformation of the control layer and the reflecting zone. The deformed reflecting zone is imaged between the bars of a second bar system onto a projection screen on which an image corresponding to the image to be amplified, but of greater brightness, is visible.

To produce an electrostatic field according to the device disclosed in Swiss Pat. No. 301,222, two transparent homogenous electrode surfaces are connected to one of the photoelectric conducting layer or the control layer and are linked to a power source. During exposure of the photoelectric conducting layer to the image, its electrical resistance changes. The resistance change in the longitudinal direction, that is parallel to the electrical field, causes a local change of the voltage distribution between the photoelectric conducting layer and the interspace between the conducting layer and the control layer, which in turn causes a corresponding deformation of the control layer and the reflecting zone.

This operating principle, which utilizes the resistance change of the photoelectric conducting layer in the longitudinal direction, has several drawbacks which are explained, for example, in detail in Swiss Pat. No. 378,432. Among other drawbacks, a relatively large minimal thickness of the photoelectric conducting layer is required to obtain useful control. However, this poses the potential problem of disturbing spacecharge effects.

In Swiss Pat. No. 378,432, an optical image intensifier is described in which the drawbacks of the previously described image intensifier are avoided by using transverse local electrical conductance or resistance changes rather than longitudinal changes. The electrode which is in contact with the photoelectric conducting layer is formed as a strip grid wherein the electrically conducting strips which are arranged with regular spacing next to one another are disposed at right angles to the bars of the first bar system and are connected in alternating sequence to one or the other pole of the electrical power source. In addition, an optical strip grid is placed in front of the electrode grid on the exposure side; which comprises strips that are preferably disposed so that they form an angle of 45° with the electrode grid.

With this electrode configuration and arrangement, the potential distribution in the photoelectric conducting layer changes during exposure and it is this potential distribution in the layer alone which determines the forces acting on the control layer or the reflecting zone. The photoelectric conducting layer therefore can be as thin as desired as long as its electrical resistance is not impaired by leakage through its base. The difficulty of high specific electrical resistance modulation is also eliminated because a suitable selection of the voltage between the electrode strips and the thickness of the layer allows for every practically usable value to be utilized.

Despite these evident improvements versus the image intensifiers that operate with longitudinal modulation, the image intensifier described in Swiss Pat. No. 378,432 did not gain general acceptance in practice. One of the principal reasons for this fact is the undesired base deformation of the control layer that occurs with the alternating polarity of the individual electrode strips particular to this image intensifier, which is much larger than the intended useful deformation caused by exposure to the image. This unfavorable relationship between the base and useful deformation is equivalent to low sensitivity and small efficiency of the entire image intensifying arrangement. A further difficulty associated with this image intensifier is caused by practically unavoidable local short circuits between neighboring strips of the electrode grid. When a short circuit occurs in the intensifier, it does not cause just a local disturbance of the image, but rather a total loss of the whole picture. The image intensifier completely loses its capacity to function in case of a short circuit.

It is therefore an object of the present invention to provide a novel optical image intensifier having operating characteristics that are substantially improved over those of a device of the type described in Swiss Pat. No. 378,432, with respect to efficiency and short circuit sensitivity.

DETAILED DESCRIPTION

Figure 1:
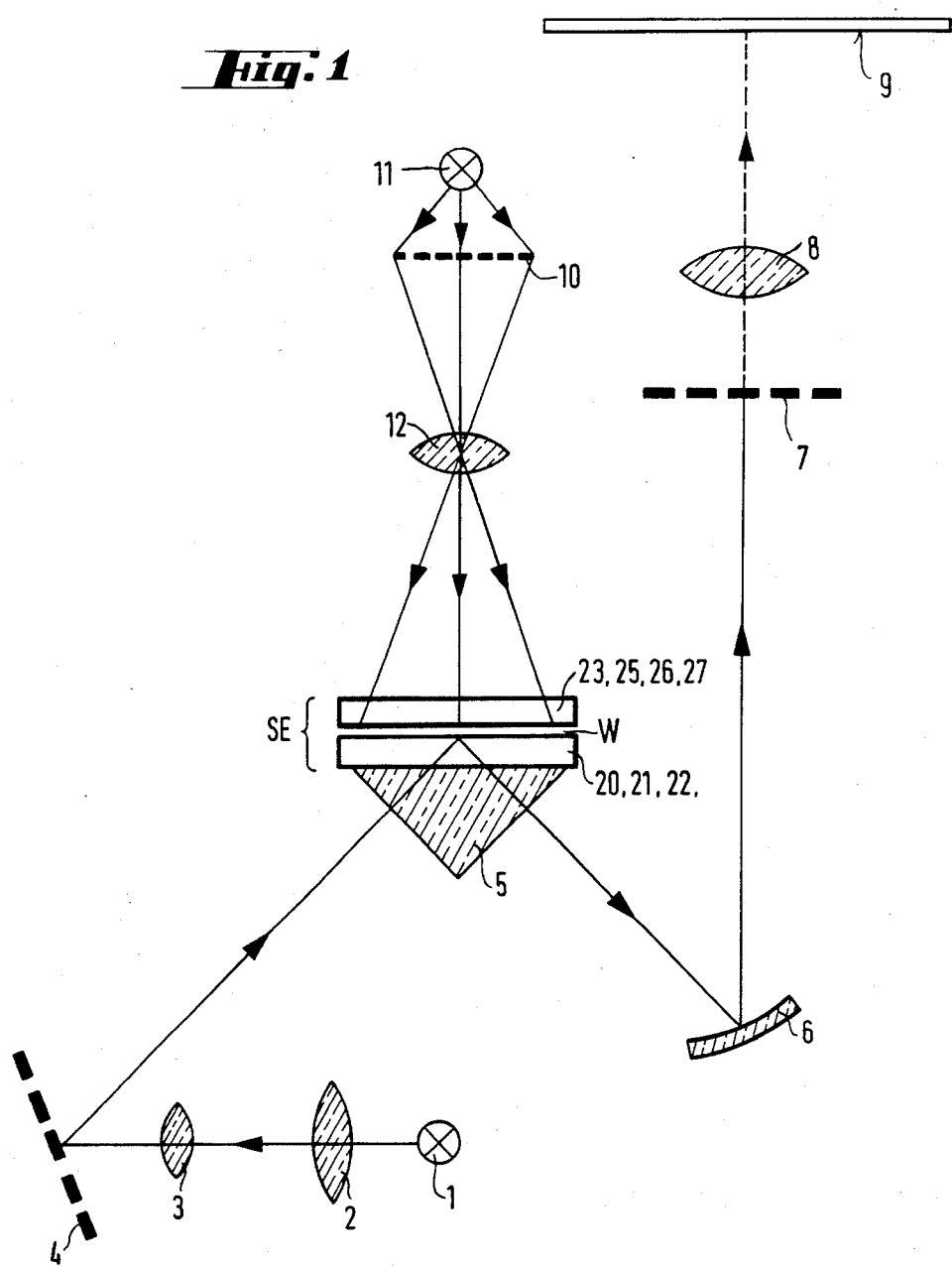
FIG. 1 is a schematic representation of an electro-optical image intensifier.

Referring to FIG. 1, which is a schematic illustration of the general configuration of an optical image intensifier, light from a light source 1 impinges on a first bar system 4 via two lenses or lens systems 2 and 3, and is reflected therefrom via a prism 5 onto a control-layer bearing control element SE. The light is thereafter reflected to a second bar system 7 via a concave reflector 6 and is finally passed via a lens or lens system 8 to a projection surface 9. The image 10 to be intensified is illuminated by a light source 11 and imaged via a lens or lens systems 12 on the conducting layer of the control element SE. The longitudinal edges of bars 4 and 7 are disposed in FIG. 1 at a right angle to the plane of the drawing. Further details of the construction and operation of an optical image intensifier in general can be found, for example, in previously discussed Swiss Pat. Nos. 301,222 and 378,432.

The present invention lies in the details of the control element SE, of which four embodiments are represented in FIGS. 2 to 5. For reasons of simplicity and clarity, the drawing only shows the parts of the control element that are essential for an understanding of the invention. Frames, fastenings, etc. are omitted.

Figure 2:
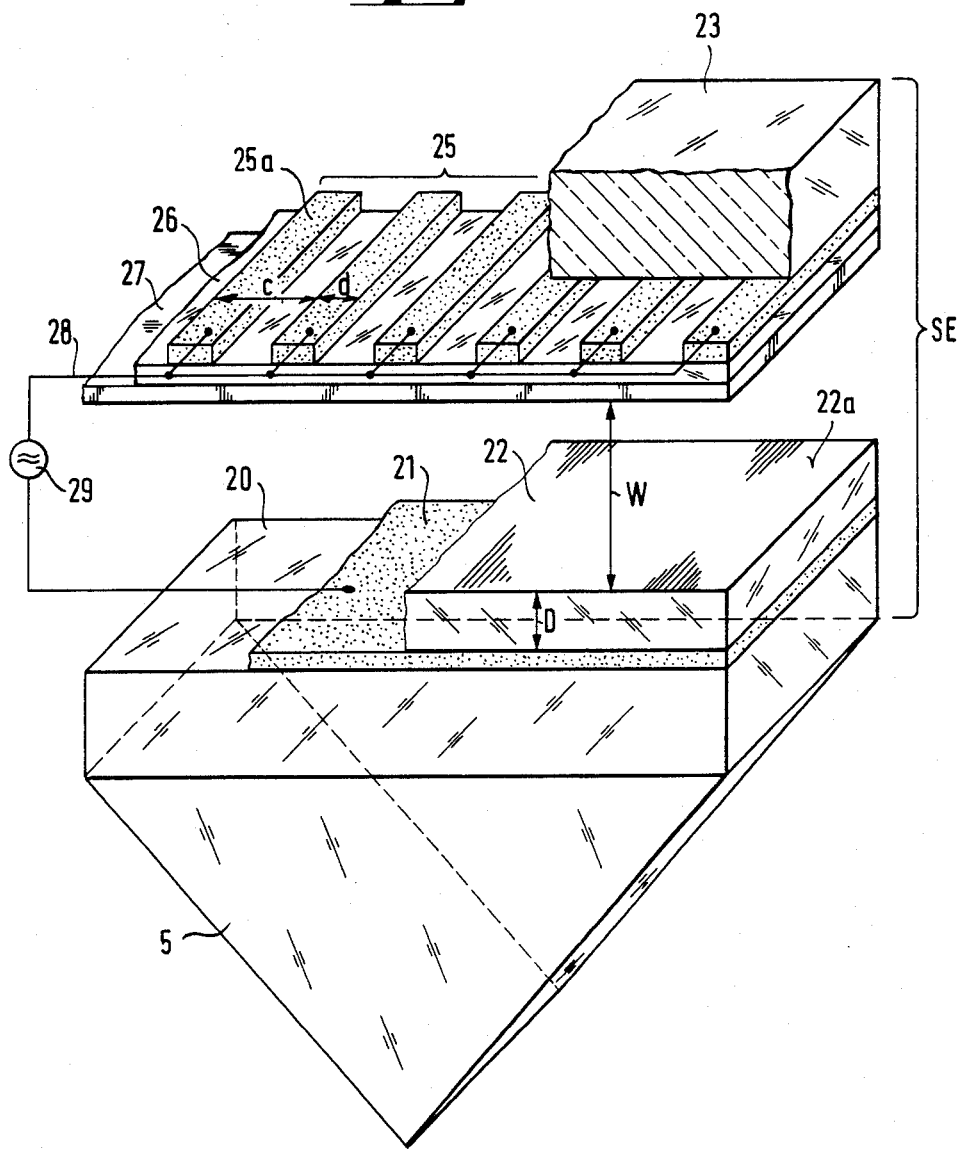
FIG. 2 illustrates a first embodiment of a control element SE.

In the embodiment illustrated in FIG. 2, the control element SE comprises a transparent lower carrier plate 20 on which a transparent conductivity coating 21 and a control layer 22 are located. A transparent upper carrier plate 23 on which a metallic conducting electrode grid 25, a photoelectric conducting layer 26 and a black, opaque, nonconducting protective layer 27 are arranged in sequence also form part of the control element SE. An airgap, with a width W of about 10–30μ, is provided between the upper and lower carrier plates.

The electrode grid 25 comprises a series of parallel transparent electrically conducting strips 25a that are arranged with regular spacing between one another and are disposed parallel to the longitudinal edges of the bars 4 and 7. The grid period c of the electrode grid, i.e., the width of one conducting strip and the space adjacent to it, is preferably in the range of about 50–200μ and more preferably is as thin as possible, at least less than 100μ. The width d of each conducting strip 25a is about 1/6 to ¼ of the grid period c, preferably about 1/5. With a practical grid period of about 150μ, the strip width is then preferably about 30μ and the distance between each pair of adjacent conducting strips is about 120μ.

The individual conducting strips 25a of the electrode grid 25 are connected to one another at one end by a conductor 28 and to one pole of an alternating power source 29. The other pole of the power source 29 is connected with the conductivity coating 21, which functions as a counter-electrode, on the lower carrier plate. The electromotive force of the power source 29 is preferably about 200–300 $V_{effective}$ with a frequency of about 100–500 Hz.

The individual conducting strips 25a of the electrode grid 25 all have the same potential relative to the counter-electrode 21. Without exposure of the photoelectric conducting layer, the counter-electrode insulates or conducts poorly so that relatively flat potential troughs are formed between the conducting strips 25a. In other words, a smaller potential relative to counterelectrode 21 exists between the conducting strips than at the location of the conducting strips 25a. These potential troughs cause a wavelike deformation of the control layer 22, the waves being directed according to the orientation of the electrode grid parallel to the longitudinal edges of the bars 4 and 7. The light stemming from the light source 1 and totally reflected on the surface 22a of the control layer 22 is deflected transversely relative to the bars 7 and reaches the projection surface 9 past the bars. The projection surface thereby appears homogenously brighter.

When the photoelectric conducting layer 26 is uniformly illuminated, the potentials on and between the conducting strips 25a of electrode grid 25 compensate one another and the control layer 22 does not experience any deformation. The light which is totally reflected from the control layer cannot pass the bars 7 to reach the projection screen, and therefore the screen 9 remains dark.

During exposure of the photoelectric conducting layer 26 to an image, a corresponding but inverted brightness distribution related to the image appears on the projection surface, with the light portions of the image 10 to be amplified appearing dark and dark portions appearing light on the projection surface.

Figure 3:
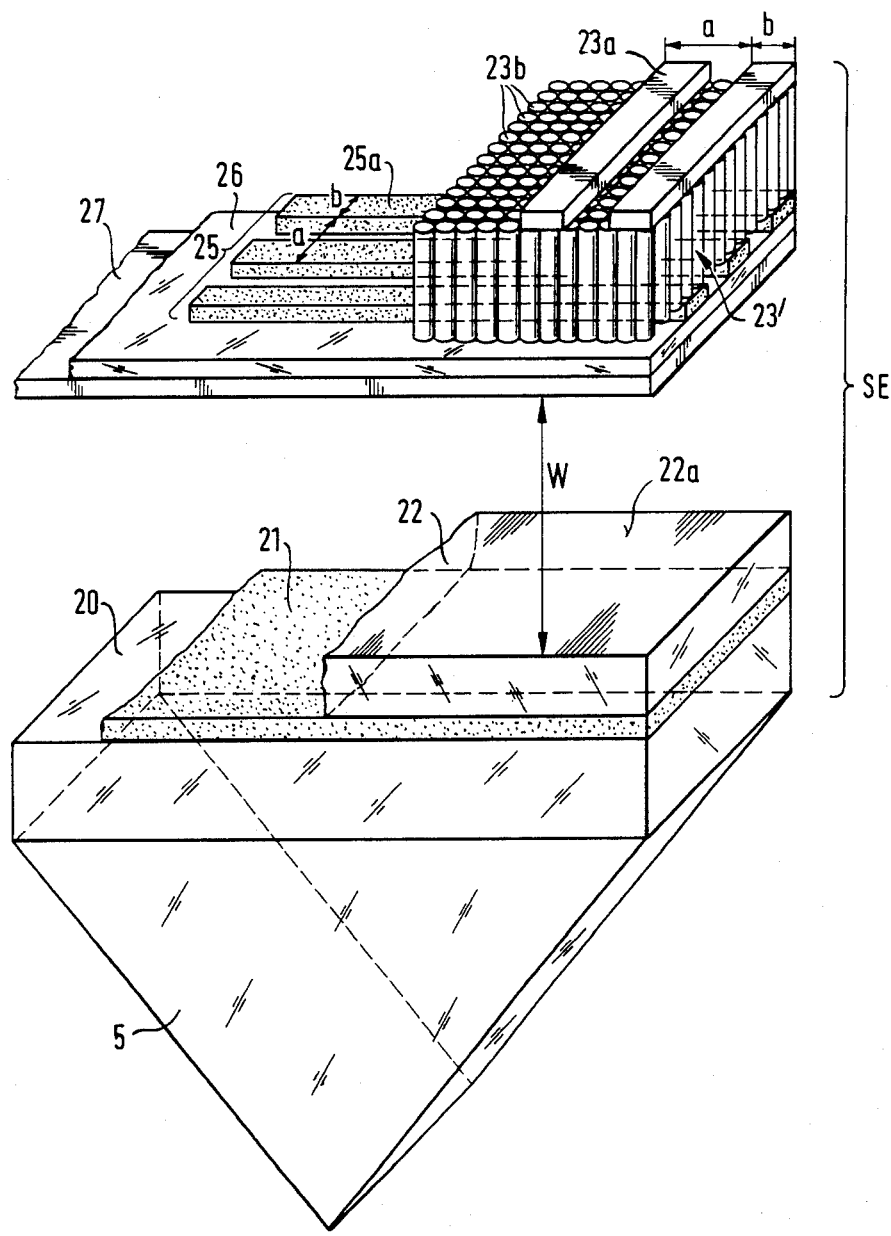
FIG. 3 illustrates a second embodiment of a control element SE.
Figure 4:
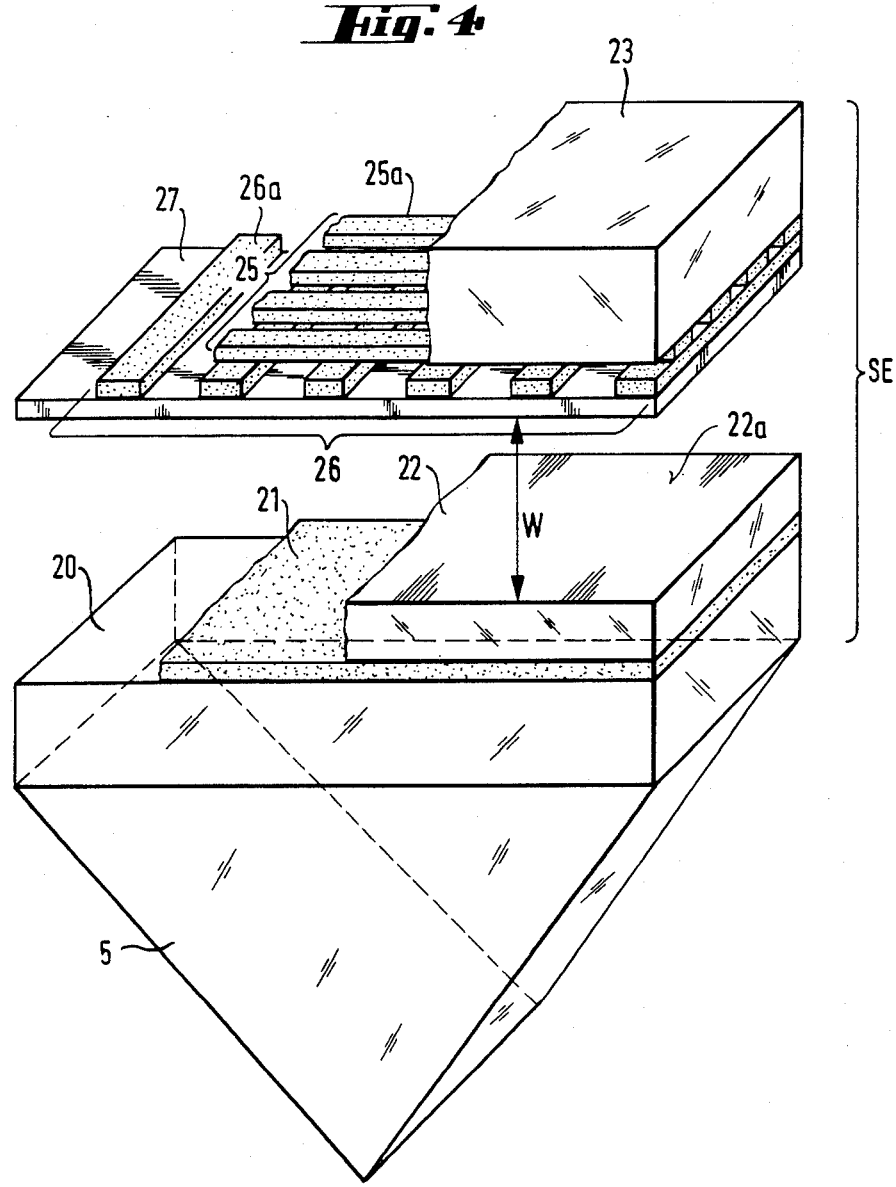
FIG. 4 illustrates a third embodiment of a control element SE.

In FIG. 3, another embodiment of the control element SE is illustrated. This embodiment differs from the embodiment of FIG. 4 only in the shape of the upper carrier plate. In the embodiment of FIG. 3, the upper carrier plate 23 is not a simple glass plate, but rather a fiberboard 23' comprising a number of light conducting fibers 23b made of glass or plastic that are disposed parallel to one another and perpendicular to the plate plane. The fiberboard and lightconductors can be connected together, for example, by fusion. An optical grid made of parallel strips 23a of an opaque material is arranged on the exposure-side surface of the fiberboard 23'.

The opaque strips 23a are orthogonally disposed relative to the conducting strips 25a of the electrode grid 25. The grid period a of the optical grid on the fiberboard 23' is as large as, and preferably larger by a factor of 1.1 to 2, particularly 1.5, than the grid period c of the electrode grid 25. The same holds for the strip width b, and the two grids are preferably complementary. That is, the strip width d of the electrode grid 25 corresponds to the distance between two opaque strips 23a, and the distance between two electrode strips 25a corresponds to the strip width b.

The control element SE shown in FIG. 3 is inserted in the imaging path of light rays in a different manner from that shown in FIG. 2, so that the strips 25a of the electrode grid 25 are not parallel, but rather orthogonally disposed relative to the longitudinal edges of bars 4 and 7. This orientation of the electrode grid 25 also applies for the embodiments illustrated in FIGS. 4 and 5.

Without exposure of the photoelectric conducting layer 26, potential troughs are formed between the individual conducting strips 25a of electrode grid 25, as with the control element SE of FIG. 2, which cause a wavelike deformation of the control layer 22. Because these waves are disposed orthogonally relative to the bars 7, however, the light totally reflected on the surface 22a of control layer 22 is deflected by the wave deformation parallel, rather than transverse, to the bars 7 so that the projection surface 9 remains dark.

When the control element SE is uniformly illuminated from above, the strip grid 23a located on the fiberboard 23' covers the light falling onto the photoelectric conducting layer 26 in a striped pattern. The different potentials on and between the conducting strips 25a do not compensate one another everywhere, but rather a non-uniform potential distribution, with several potential "holes" corresponding to the cross-grating formed by the electrode grid 25 and the optical grid 23a, results, causing a cross-grid deformation of the surface 22a of control layer 22. This cross-grid deformation causes a deflection of projection light transverse to the bars 7 and with it a brightening of the projection surface 9. Correspondingly, during exposure of the photoelectric conducting layer 26 to the image, a picture 10 is seen positively on projection surface 9. That is, light image portions appear light and dark ones appear dark.

A wavelike base deformation parallel to the bars 7 exists during the absence of exposure of the photoelectric conducting layer 26 in the control element SE in the embodiment of FIG. 3. During exposure, a desired deformation transverse to the bars 7 is achieved, which causes the brightening of the projection surface corresponding to the image. Experiments have shown that with such a control element, in which all conducting strips 25a of the electrode grid have the same potential relative to the counter-electrode 21, the base and useful deformation are essentially about the same size. The device according to the invention thus has a much larger efficiency than the device disclosed, for example, in Swiss Pat. No. 378,432.

By superimposing one and the same potential on all conducting strips 25a, the danger of a short circuit occurring between the individual conducting strips 25a is practically ruled out. A short circuit which may occur in the control element only leads to a local disturbance of the image, and has no influence on the functioning of the device.

As has been described previously, a positive imaging can be obtained by orienting the electrode grids 25 orthogonally relative to the bars 7 and by effectively masking the image projected on the photoelectric conducting layer 26 in the form of a strip grid whereby the strip grid is preferably oriented essentially orthogonal relative to the electrode grid.

The effective grid masking of the light emitted from the image 10 and projected on the photoelectric conducting layer 26 can also be achieved in another manner. According to a particularly practical embodiment of the invention shown in FIG. 4, the photoelectric conducting layer 26 is itself grid-shaped. That is, the layer 26 is not a homogenous continuous surface as in FIGS. 2 and 3, but rather comprises a row of strips 26a made of photoelectric material arranged parallel one another and disposed parallel to the bars 4 and 7 like the grid strips 23a. The widths of the photoelectric conducting strips 26a and their mutual spacing are equal to, or preferably larger than, the corresponding dimensions of the electrode grid 25 by a proportionality factor of 1.1 to 2, especially about 1.5.

Figure 5:
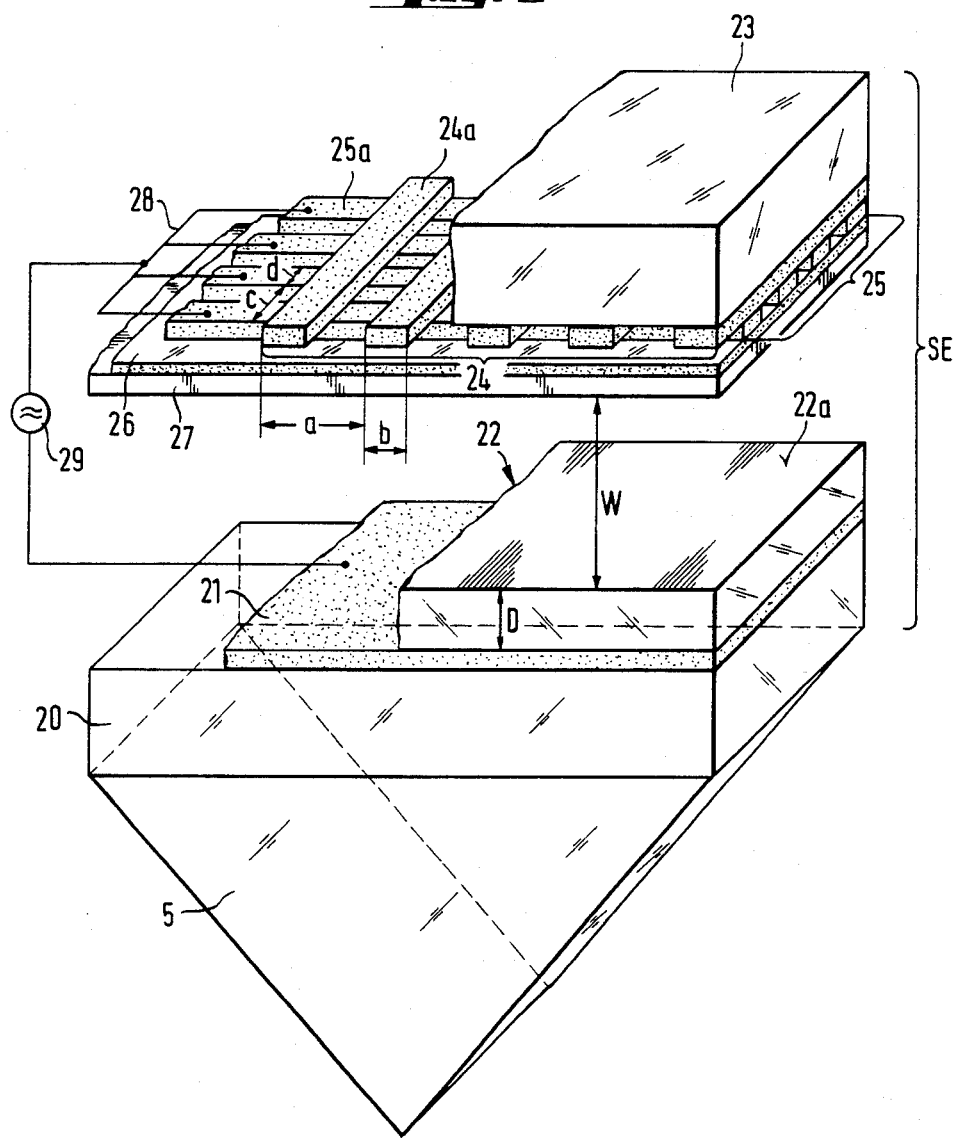
FIG. 5 illustrates a fourth embodiment of a control element SE.

A further possibility for the optical masking of light falling on the photoelectric conducting layer 26 is illustrated in FIG. 5. In this embodiment, a mirror grid 24 is provided between the electrode grid 25 and the upper carrier plate 23. The mirror grid comprises a row of nonconducting reflecting strips 24a arranged as interference mirrors. The orientation and dimensioning of the mirror grid 24 is the same as that of the optical grid 23a illustrated in FIG. 3.

The optical grid pattern masking of the light falling on the photoelectric conducting layer 26 can also be effectively achieved by inserting a suitable grid in a suitable location in the path of the rays between the light source 11 and the control element SE, or by grid-illuminating the image 10 to be amplified in a different manner, e.g. with laser beams or the like. It will be apparent that the image to be amplified can of course be self-illuminating.

The optical grid pattern masking is preferably disposed essentially orthogonal relative to the electrode grid 25 and preferably has somewhat larger dimensions with respect to grid period and strip width. Of course, in special cases an orientation and/or dimensioning of the grid pattern that differs therefrom is possible.

If the device is to be used to amplify a television picture or another image having a grid pattern therein, the control element is preferably arranged so that the grid lines of the television picture or the like are disposed parallel to the prism top and the prism top is orthogonal to the electrode grid and the bars in case of a negative image intensification, and at an angle of 45° relative to the electrode grid or the optical grid, in the case of a positive image intensification, in order to avoid interference phenomena between the television grid and the electrode grid or optical grid.

The control layer 22 can be made of any elastoviscous material that has surface and optical properties that are deformed or changed by an electrical field. Preferably, the control layer is a gel-layer with a thickness D of about 30–120, more preferably less than 10$\mu$, and most preferably about 70$\mu$. The gel designated Sil-Gel 604 can be used as such a gel, for example, and is available from the Wacker Company, Munich, Federal Republic of Germany.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A device for amplifying the intensity of an optically created image, comprising:
   a light source;
   a first bar system for modulating light rays from said source;
   a control element for reflecting modulated rays from said first bar system, including:
     a control layer deformable by electrical field forces and having a reflecting surface thereon,
     an electrode grid comprising a group of electrically conductive strips having regular spacing between them,
     a photoelectric conducting layer on which an image to be amplified is imaged to modulate an electric field produced by said electrode grid, said photoelectric conducting layer being disposed between said electrode grid and said control layer,
     a counterelectrode disposed on the side of said control layer opposite said photoelectric, conducting layer,
     an alternating current power source connected between said electrode grid and said counter-electrode, and
     means for applying the same electrical potential to each of the conductive strips of said electrode grid relative to said counter-electrode;
   a projection surface;
   means for imaging light reflected by said control element on said projection surface; and
   a second bar system disposed between said imaging means and said projection surface.

2. A device according to claim 1 further comprising means for effectively masking the image to be amplified in the form of a strip grid pattern disposed orthogonal to said electrode grid, whereby said electrode grid is disposed orthogonal to said second bar system.

3. A device according to claim 2, wherein said masking means comprises a mirror grid disposed on the exposure side of said electrode grid and having parallel spaced reflecting strips for reflecting at least some wavelength regions.

4. A device according to claim 2, wherein said masking means comprises a fiberboard disposed on the exposure side of said electrode grid having a plurality of parallel light-conducting fibers arranged essentially at right angles to the plane of said fiberboard, and an optical strip grid located on the exposure side of said fiberboard and including grid strips which are nontransparent at least for some wavelength regions.

5. A device according to claim 4, wherein said fiberboard supports said electrode grid and said photoelectric conducting layer.

6. A device according to claim 2, wherein said photoelectric conducting layer comprises individual parallel, spaced photoelectric conducting strips disposed essentially orthogonal relative to the conductive strips of said electrode grid.

7. A device according to one of claims 1 to 6, wherein said control layer is a gel-layer having a thickness in the range of about 30–120μ.

8. A device according to claim 7 wherein the thickness of said gel-layer is less than 100 μ.

9. A device according to one of claims 1 to 6, wherein the grid period of said electrode grid is in the range of about 50–200μ.

10. A device according to claim 9 wherein the grid period of said electrode grid is less than 100μ.

11. A device according to claim 9, wherein the width of each of the conducting strips of said electrode grid is in the range of about 1/6 to 1/4 of the grid period.

12. A device according to claim 11 wherein the width of each conducting strip is 1/5 of the grid period.

13. A device according to claim 2, wherein the grid period of the strip grid produced on the photoelectric conducting layer of said masking means is larger than the grid period of said electrode grid by a factor in the range of 1.1–2.

14. A device according to claim 13, wherein the grid period of the strip grip produced on the photoelectric conducting layer by said masking means is larger than the grid period of said electrode grid by a factor of 1.5.

15. A device according to claim 6, wherein the alternating voltage between the electrode grid and the counterelectrode is about 200–300 $V_{effective}$ and its frequency is about 100–500 Hz.

16. A device according to claim 1 wherein the reflecting surface of said control layer faces said photoelectric conducting layer and essentially totally reflects light coming from said light source.

17. A device according to claim 1 wherein said photoelectric conducting layer is disposed in front of an essentially opaque and non-conducting layer on the control layer.

18. A device according to claim 1 wherein a free space of about 10 to 30μ is provided between the control layer and the photoelectric conducting layer.

* * * * *